United States Patent [19]
Kerrigan et al.

[11] Patent Number: 5,978,217
[45] Date of Patent: Nov. 2, 1999

[54] COOLING AIR DIFFUSER FOR COMPUTER ENCLOSURE

[75] Inventors: Brian Michael Kerrigan, Austin; Larry Thomas Cooper; Jeffrey William Young, both of Round Rock, all of Tex.

[73] Assignee: International Business Machines Corporation, Armonk, N.Y.

[21] Appl. No.: 09/175,039

[22] Filed: Oct. 19, 1998

[51] Int. Cl.[6] .................................................. H05K 7/20
[52] U.S. Cl. ........................ 361/694; 361/683; 361/687; 361/695; 361/724; 165/80.4; 312/223.2; 454/184
[58] Field of Search ................................... 361/683, 685, 361/687, 695, 694, 697, 724; 165/80.3, 58, 122, 80.4; 312/138.1, 298, 223.2, 236, 257.1; 340/635, 584; 454/184

[56] References Cited

U.S. PATENT DOCUMENTS

| | | | |
|---|---|---|---|
| 4,644,443 | 2/1987 | Swensen et al. | 161/384 |
| 5,000,079 | 3/1991 | Maedis | 361/384 |
| 5,748,442 | 5/1998 | Toor | 361/685 |

*Primary Examiner*—Leo P. Picard
*Assistant Examiner*—Michael Datskovsky
*Attorney, Agent, or Firm*—Casimer K. Salys; James E. Bradley; Andrew J. Dillon

[57] ABSTRACT

A computer has an internal chassis with a variety of electronic components. The chassis is mounted within an enclosure having a ventilation port for exhaust air on a lower surface. A diffuser is mounted to the lower end of the enclosure. The diffuser has a series of openings and baffles which align with the ventilation port for directing the flow of exhaust air away from either side of the computer. The diffuser also allows for full containment of hot or flaming parts to satisfy safety codes. In addition, a pedestal is detachably coupled to the diffuser and is configured to enhance the air flow performance of the diffuser.

16 Claims, 3 Drawing Sheets

COOLING AIR DIFFUSER FOR COMPUTER ENCLOSURE

TECHNICAL FIELD

This invention relates in general to electronic computers and in particular to a cooling air diffuser for the enclosure of an electronic computer.

BACKGROUND ART

Electronic computers house a variety of electronic components such as printed circuit boards, an internal modem, connectors, a ventilation fan, a power supply and the like. Each of these components is mounted to a chassis which is located inside an external housing or enclosure. The enclosure also protects the exposed components from physical contact and shields the components from electromagnetic interference.

Typically, enclosures for computer towers have a base which is flush mounted with a desk or floor support surface. Because of this geometry and a safety code requirement for hot or flaming parts to avoid contact with the support surface, the lower surface of the enclosure is not vented. Instead, the ventilation fan typically exhausts air through a port along upper or side surfaces of the enclosure. Although these designs are workable, an improved ventilation system for computers is desirable.

DISCLOSURE OF THE INVENTION

A computer has an internal chassis with a variety of electronic components. The chassis is mounted within an enclosure having a ventilation port for exhaust air on a lower surface. A diffuser is mounted to the lower end of the enclosure. The diffuser has a series of openings and baffles which align with the ventilation port for directing the flow of exhaust air away from either side of the computer. The diffuser also allows for full containment of hot or flaming parts to satisfy safety codes. In addition, a pedestal is detachably coupled to the diffuser and is configured to enhance the air flow performance of the diffuser.

BEST MODE FOR CARRYING OUT THE INVENTION

Figure 1:
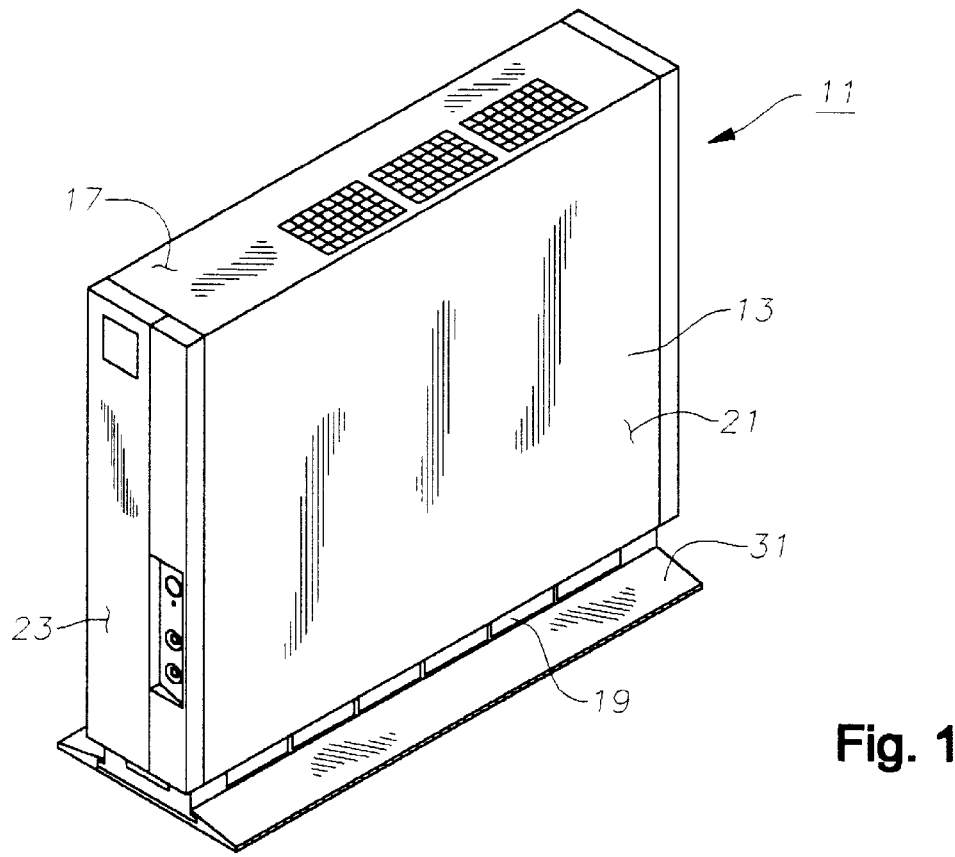
FIG. 1 is a front isometric view of a computer constructed in accordance with the invention.
Figure 2:
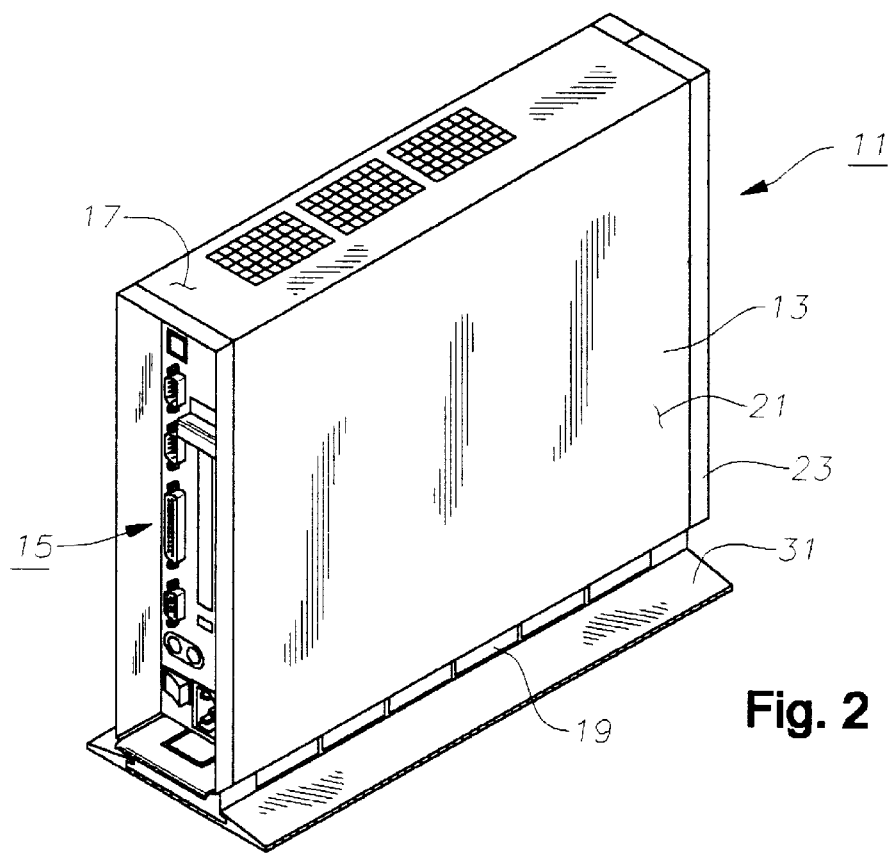
FIG. 2 is a rear isometric view of the computer of FIG. 1.

Referring to FIGS. 1 and 2, a network computer 11 is shown. Computer 11 has an external metal housing or enclosure 13 and an internal metal frame or chassis 15. Enclosure 13 is essentially a five-sided rectangular box with an opening on a rearward end. Enclosure 13 has a top panel 17, a bottom panel 19, and two side panels 21, all of which are formed from a single sheet of metal which is bent to form four corners. The top panel 17 and the bottom panel 19 having widths which are less than a height of the side panels 21. A front panel 23 is integrally joined to the forward end of enclosure 13. A base 31 is mounted to the lower surface of bottom panel 19. Base 31 is only slightly larger than the area of bottom panel 19 and is significantly smaller than prior art designs.

Figure 3:
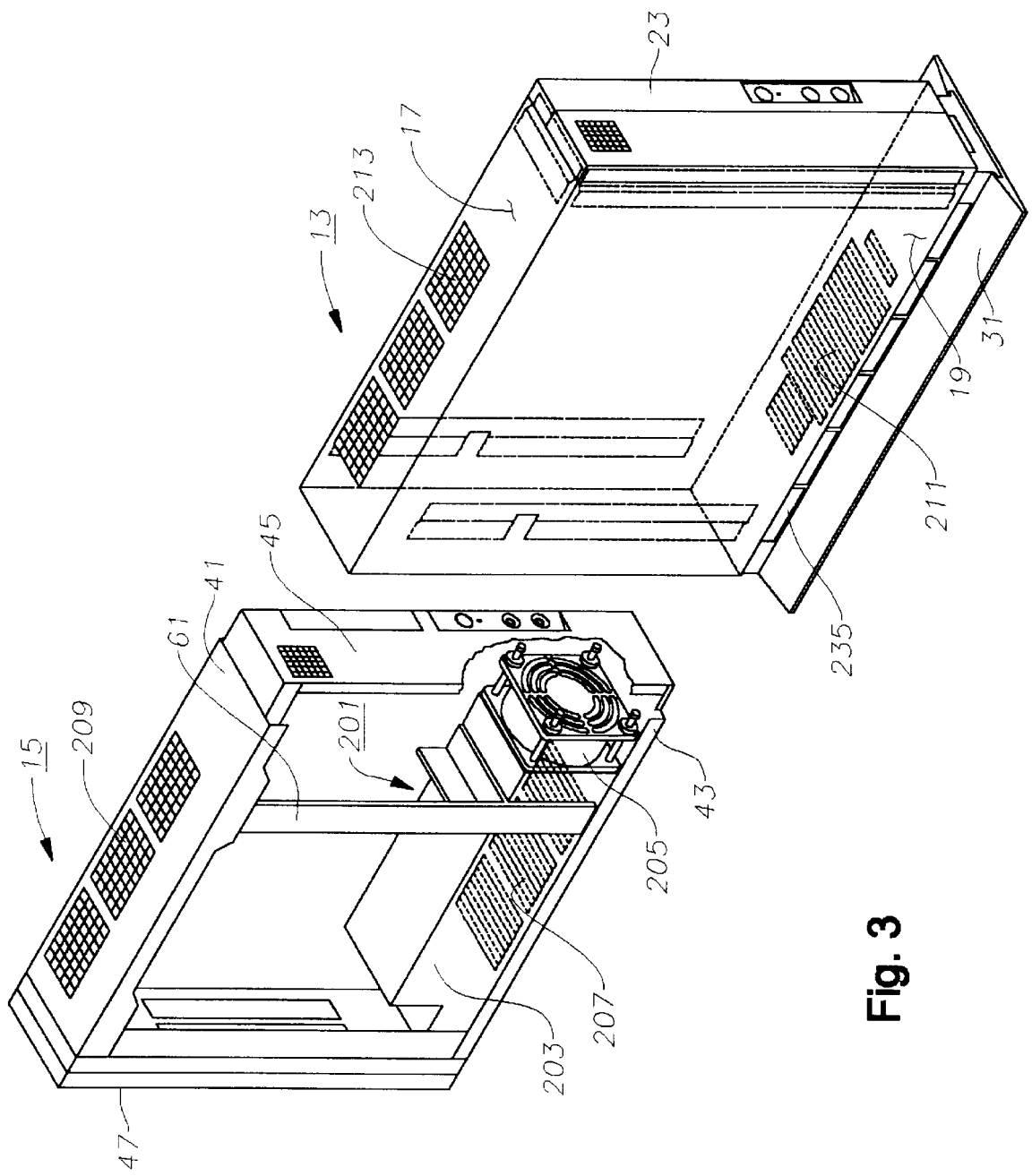
FIG. 3 is a front isometric, partially transparent view of the computer of FIG. 1 shown with its chassis removed from its enclosure and with its electronic components removed.

As shown in FIG. 3, chassis 15 is slidably mounted within enclosure 13. Chassis 15 has a rectangular perimeter of four wall-like frame members including a top 41, a bottom 43 and front and rear ends 45, 47. This configuration allows the vertical sides of chassis 15 to remain open and uncovered. A strut 61 is mounted to and extends vertically between top 41 and bottom 43.

Figure 4:
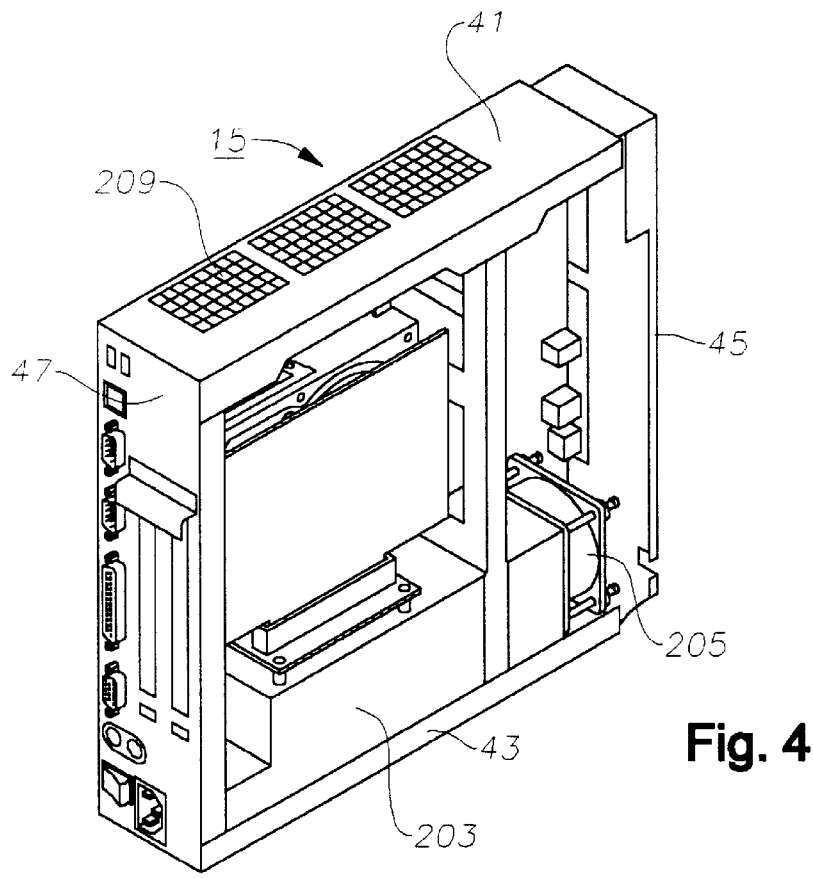
FIG. 4 is a rear isometric view of the chassis of FIG. 3 shown with its electronic components.

Referring now to FIGS. 3 and 4, chassis 15 also has a power supply 201 mounted to bottom 43. Power supply 201 has a square tubular sheet metal housing 203 with an opening on its forward end. A ventilation fan 205 is mounted to the opening and is located within a perimeter of chassis 15 and is spaced apart from a rearward side of front end 45 and the other sidewalls of chassis 15 and enclosure 13. Housing 203 is open on its lower side for communication with an air exhaust port 207 in bottom 43. An air intake port 209 is located at the upper end of chassis 15 in top 41. Ports 207, 209 have counterpart ports 211, 213, respectively, in enclosure 13. Ports 211, 213 are essentially a series of perforations in bottom panel 19 and top panel 17, respectively. When chassis 15 is mounted in enclosure 13 (FIG. 4), port 207 aligns with port 211 and port 209 aligns with port 213.

Figure 5:
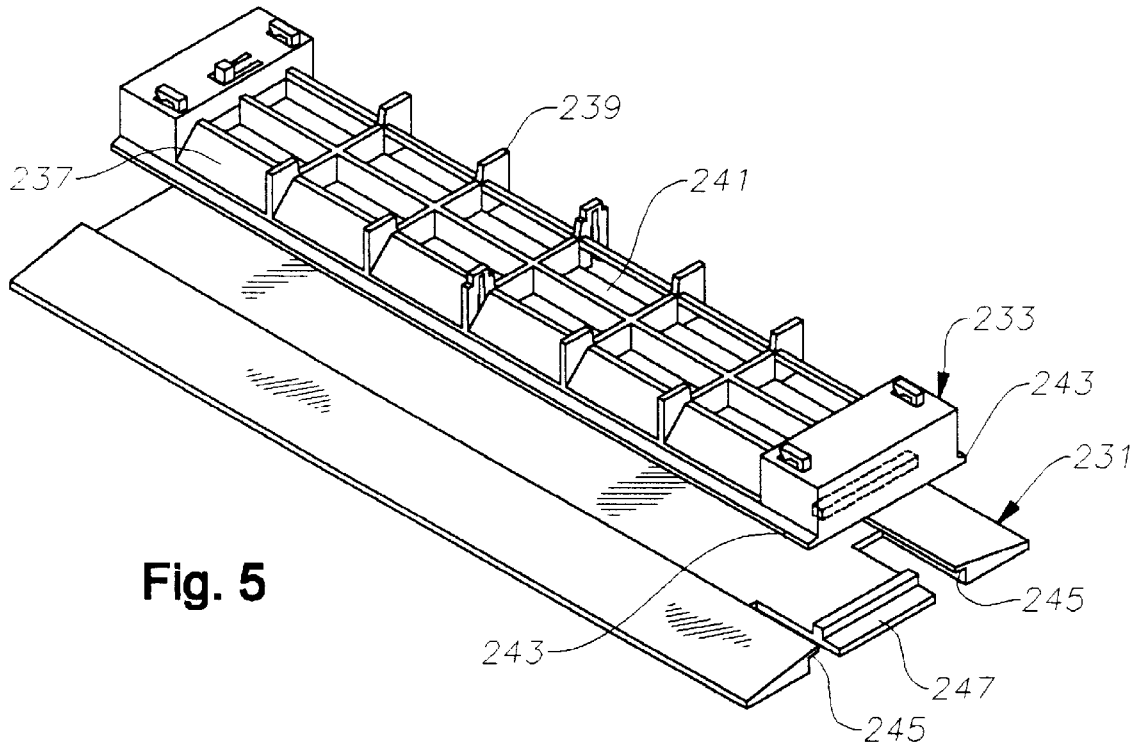
FIG. 5 is an isometric view of a diffuser of the computer of FIG. 1.

As shown in FIG. 5, base 31 comprises a pedestal 231 which defines the bottom of computer 11 and a diffuser 233. Diffuser 233 comprises a generally flat rectangular member with a plurality of slots 235 (FIG. 3) extending along and below side panels 21 from near the back to near the front. The slots 235 are formed by downward inclined walls 237 and vertical stand-offs or legs 239 to diffuse exhausting air laterally from enclosure 13. Legs 239 are spaced-apart from each other and mount to the lower surface of bottom panel 19. A slot 235 is defined between each adjacent pair of the legs 239. Legs 239 also create space between diffuser 233 and the lower surface of bottom panel 19. Diffuser 233 also has an upper surface with a trough 241 for containing any debris that might fall through exhaust port 211 in bottom panel 19 during a fire.

Pedestal 231 is detachably coupled to diffuser 233 for stabilizing computer 11. The elongated sides of diffuser 233 each have a flat flange 243 for slidably coupling to a groove 245 in pedestal 231. Each flange 243 has a taper on one end to create an interference fit between flanges 243 and the grooves 245 in pedestal 231 when it is installed on diffuser 233. Pedestal 231 also has a latch 247 for releasably connecting it to diffuser 231.

In operation, enclosure 13 closely receives chassis 15 such that top panel 17 and bottom panel 19 slidably abut top 41 and bottom 43. In addition, the vertical side edge portions of top 41 and bottom 43 slidably engage side panels 21 to eliminate excessive movement between chassis 15 and enclosure 13. When ventilation fan 205 is on, ambient air will be drawn into computer 11 through air intake ports 213, 209. This air is circulated downward through the interior of computer 11 which is warmed by heat generated by the electrical components. The circulating air cools the electrical components and maintains them at a proper operating temperature. Ventilation fan 205 then draws the warmed air out of computer 11 and forces it into housing 203 past the power supply 201 which is also cooled by the air circulation. The heated air is forced out of housing 203 and through exhaust ports 207, 211. As the heated air exits enclosure 13 and vents back into the ambient air, it passes through diffuser 233 so that it is directed to either side of computer 11.

The invention has significant advantages. The diffuser allows exhaust air to be ported out the bottom of the enclosure and directed away from either side of the computer. In the event of fire, the diffuser conforms with the safety code by fully containing hot or flaming parts of the computer. The diffuser is snap fit permanently to the enclosure and cannot be mistakenly defeated or misused by the end user.

While the invention has been shown or described in only some of its forms, it should be apparent to those skilled in the art that it is not so limited, but is susceptible to various changes without departing from the scope of the invention.

I claim:

1. A computer, comprising;
   a chassis having a plurality of electronic components mounted thereto;
   a generally rectangular housing surrounding the chassis, the housing having a front, a back and at least two sides extending between a top and a bottom, the top and the bottom having widths which are less than a height of the sides;
   an air intake port in the housing located remotely from the bottom;
   a ventilation port located adjacent the bottom of the housing;
   a ventilation fan mounted to the housing for drawing cooling air into the air intake port, downward through the housing, and exhausting air through the ventilation port; and
   a diffuser mounted adjacent to the bottom of the housing and the ventilation port for directing exhaust air away from the housing.

2. The computer of claim 1 wherein the ventilation port comprises a plurality of slots extending along the lower edges of both sides.

3. The computer of claim 2 wherein the diffuser comprises lower downward inclined walls adjacent the slots to diffuse exhausting air laterally from the housing.

4. The computer of claim 1 wherein the housing comprises an enclosure that receives the chassis, the enclosure having a perforated bottom panel to which the diffuser is mounted, and the diffuser has a base which forms the bottom of the housing.

5. The computer of claim 4 wherein the diffuser has an upper surface with a trough for containing any debris that might fall through the perforated bottom panel during a fire.

6. A computer, comprising:
   a chassis having a plurality of electronic components mounted thereto;
   an enclosure surrounding the chassis, the enclosure having a bottom panel and an air intake port located remotely from the bottom panel;
   a ventilation port in the bottom panel of the enclosure;
   a ventilation fan mounted to the enclosure for drawing cooling air into the air intake port and forcing it out the ventilation port;
   a diffuser mounted to a lower surface of the bottom panel and having an upper surface, an exhaust port located below the upper surface, and a base for supporting the computer on a flat surface and for separating the bottom panel from the flat surface; and wherein
   exhausting air flows continuously downward from the air intake port through the ventilation port, past the upper surface of the diffuser and out the exhaust port.

7. The computer of claim 6, further comprising a trough in the upper surface of the diffuser located directly beneath the ventilation port for containing any debris that might fall through the ventilation port in the event of a fire.

8. The computer of claim 6 wherein the diffuser has a plurality of legs which are spaced-apart from each other and extend upward toward the bottom panel of the enclosure, and wherein the exhaust port is defined by slots located between the legs.

9. The computer of claim 8 wherein the diffuser has a downwardly inclined wall located between each of the legs for directing exhaust air outward from the enclosure.

10. The computer of claim 6 wherein the diffuser has a generally rectangular, elongated body with two sides, a front, a back, a downwardly-inclined wall extending along each side of the body, a series of support members extending upward from the body adjacent to the downwardly-inclined wall, the support members creating space between the body of the diffuser and the lower surface of the bottom panel, and wherein the walls and the support members direct the flow of exhaust air away from both sides of the computer.

11. A computer, comprising:
   a chassis having a plurality of electronic components mounted thereto;
   an enclosure surrounding the chassis, the enclosure having an air intake port and a bottom panel;
   a ventilation port in the bottom panel of the enclosure;
   a ventilation fan mounted to the enclosure for drawing cooling air into the air intake port, downward through the enclosure, and exhausting air through the ventilation port;
   a diffuser mounted to a lower surface of the bottom panel and having a base for supporting the computer on a flat surface and for separating the bottom panel from the flat surface, the diffuser having an exhaust port for exhausting air flowing downward through the ventilation port out of the enclosure; and wherein
   the base comprises a pedestal detachably coupled to the diffuser and having a greater width than the diffuser for stabilizing the computer.

12. The computer of claim 11 wherein the diffuser is generally rectangular with elongated sides, each side having a flat flange for slidably coupling to a groove in the pedestal.

13. The computer of claim 12, further comprising a latch on the pedestal for releasably connecting the pedestal to the diffuser; and wherein
   each flange on the diffuser has a taper on one end to create an interference fit between the flanges and the grooves in the pedestal when the pedestal is installed on the diffuser.

14. A computer, comprising:
   a chassis having a plurality of electronic components mounted thereto;
   an enclosure surrounding the chassis, the enclosure having an air intake port and a bottom panel;
   a ventilation port in the bottom panel of the enclosure;
   a ventilation fan mounted to the enclosure for drawing cooling air into the air intake port, downward through the enclosure, and exhausting air through the ventilation port;
   a diffuser mounted to a lower surface of the bottom panel and having a generally rectangular, elongated body with two sides, a front, a back, a downwardly-inclined wall extending along each side of the body, a series of support members extending upward from the body adjacent to the downwardly-inclined wall, the support members creating space between the body of the diffuser and the lower surface of the bottom panel, and wherein the walls and the support members direct the flow of exhaust air away from both sides of the computer; and a pedestal detachably coupled to the diffuser and having a greater width than the diffuser for stabilizing the computer.

15. The computer of claim 14 wherein the diffuser is generally rectangular with elongated sides, each side having a flat flange for slidably coupling to a groove in the pedestal.

16. The computer of claim 15, further comprising a latch on the pedestal for releasably connecting the pedestal to the diffuser; and wherein each flange on the diffuser has a taper on one end to create an interference fit between the flanges and the grooves in the pedestal when the pedestal is installed on the diffuser.

* * * * *